Oct. 14, 1924.                              1,511,722
C. E. DICKERMAN
MILK COOLER
Filed March 24, 1922
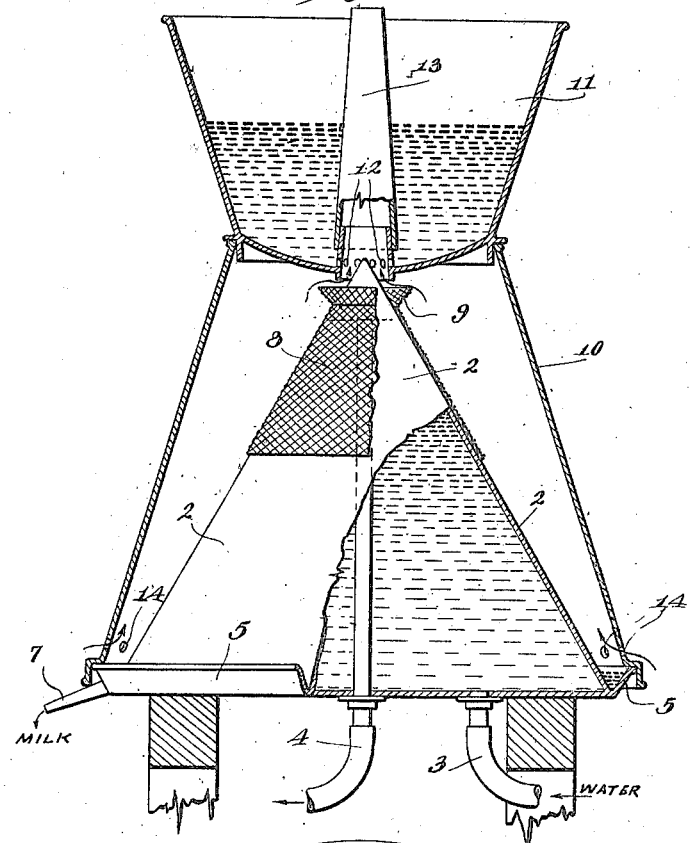
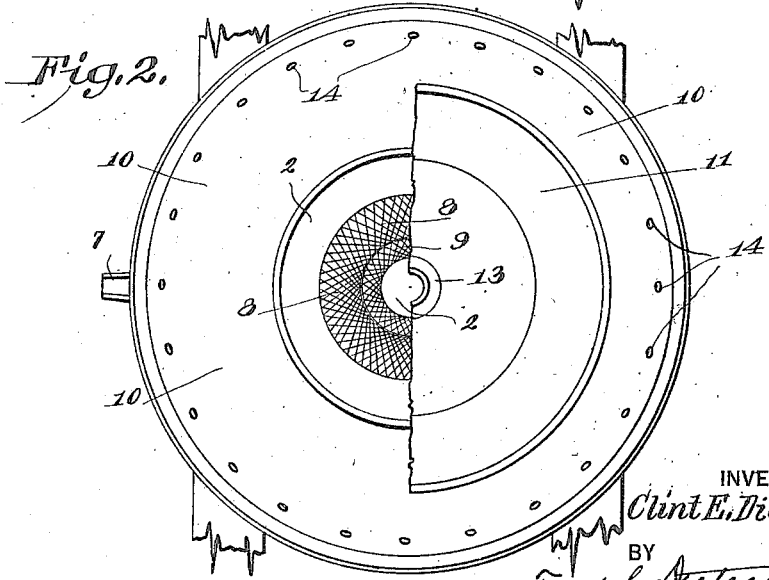
INVENTOR
Clint E. Dickerman
BY
Fred G. Dieterich
ATTORNEYS Patented Oct. 14, 1924.

1,511,722

UNITED STATES PATENT OFFICE.

CLINT E. DICKERMAN, OF NORTH VANCOUVER, BRITISH COLUMBIA, CANADA.

MILK COOLER.

Application filed March 24, 1922. Serial No. 546,461.

*To all whom it may concern:*

Be it known that I, CLINT E. DICKERMAN, citizen of the United States, residing at North Vancouver, in the Province of British Columbia, Canada, have invented certain new and useful Improvements in Milk Coolers, of which the following is a specification.

This invention relates to a milk cooler of that class wherein the milk is permitted to flow in a thin stream over the outer surface of a cone within which a cooling medium, such as water, is circulated, and the improvements are directed to a means for screening the milk at its delivery adjacent the apex of the cooling cone and for delaying the flow over the upper portion of it which is of relatively small area, whereby more effective cooling is attained.

The invention also comprises a provision inducing air to circulate over the surface of the milk as it flows down the cone and through the jets of milk as delivered thereto.

The invention is fully described in the following specification, reference being made to the drawings by which it is accompanied, in which:

Fig. 1 is a partial vertical section through the cooler, and

Fig. 2 is a plan of the same, the milk holding vessel being removed on the left half of the view to show the cone screen.

In these drawings 2 represents a hollow, conical vessel, which in use, is suitably supported at a convenient height from the floor line. Through this vessel 2 cold water is circulated from a pipe 3 delivering into the bottom to an internal pipe 4 extending to adjacent the top of the cone 2.

The base of this cone 2 is upwardly turned, as at 5, to form a circumferential channel from which is a spout 7 through which the cooled milk is delivered. A conical screen 8 of fine mesh wire gauze seats on the upper part of the cone 2 to extend about one-third down its slope, and adjacent the apex the upper edge of the screen is outwardly projected to form a channel 9 with the cone.

The lower edge of a frustro-conical casing 10, having a more acute slope, rests on the upper edge of the channel bead 5 and extends a slight distance above the apex of the cooling cone 2. On the upper edge of this casing 10 rests a container 11, into which the milk to be cooled is poured and from which it is delivered in jets on to the apex of the cooling cone 2 through a series of small apertures 12 disposed around a central tubular vent 13, which extends upward through the bottom of the container to above the level of its upper edge. For convenience of packing the upper part of this vent 13 is removably socketed on the lower part which is secured to the centre of the downwardly convex bottom of the container.

Around the lower edge of the casing 10 a series of apertures 14 is provided through which air is admitted into the space between the casing 10 and the cooling cone 2, and as no other exit is provided this air passes up the slope of the cone and is delivered through the vent or uptake 13.

In use, a vessel is placed under the spout 7 to receive the cooled and cleaned milk, and the milk to be cooled is charged into the container 11. Through the apertures 12 the milk flows inward on to the apex of the cooling cone 2 and spreads over the surface of that cone. The annular projection 9 and conical screen 8 serve not only to retain particles of foreign matter that may be in the milk, but also delays the flow of the milk over the upper part of the cone, where the surface area is small and enables the milk to be more effectively cooled.

Therefrom the milk flows over the larger surface of the cone 2 where it comes in contact with the cooler water as delivered and becomes fully cooled by the time it reaches the channel 5, from which it is delivered through the spout 7 to the container provided. The air entering at the apertures 14 passes directly over the surface of the milk finely spread over the cone 2, and through the jets of milk as they are delivered from the container 11, the vitiated air passing upward through the vent or uptake 13.

I am aware that prior to my invention milk cooling has been effected by delivery of it over the surface of a hollow cone through which a cooling medium, such as water, has been circulated, and that air has heretofore been circulated adjacent the surface of the cone. I therefore make no claim broadly to the general construction of a milk cooler as set forth in the foregoing specification, but specifically claim the means whereby the flow of the milk is delayed over the upper surface of the cone and the means whereby the flow of air is directed up the slope of the cone toward the central exit and through the jets of milk as delivered to the cone.

Having now particularly described my invention, I hereby declare that what I claim as new and desire to be protected in by Letters Patent, is:

1. A milk cooler, comprising a hollow conical vessel having a channel surrounding its base and a spout delivering from the channel, means for circulating a cooling medium through the conical vessel, a screen of wire gauze fitting on and supported on and by the upper part of the conical vessel, and means for delivering the milk to be cooled on the upper part of the cone.

2. A milk cooler, comprising a conical vessel having a channel surrounding its base and a spout delivering from the channel, means for delivering a cooling medium to the lower part of the vessel, means for delivering the relatively warmer medium from the upper part of the same, a conical screen of wire gauze fitting the upper part of the cone, the upper edge of which screen is outwardly turned from the cone to form a channel between it and the surface of the cone, and means for delivering the milk to be cooled on the upper part of the cone.

3. A milk cooler, comprising a conical vessel having a channel surrounding its base and a spout delivering from the channel, means for circulating a cooling medium through the vessel, a casing resting on the upper edge of the channel and extending to a level adjacent the apex of the cone, means for admitting air adjacent the lower edge of the casing, a milk container resting on the upper edge of the casing, said container having a central duct extending upward to adjacent the upper edge of the container, means for delivering milk in finely divided streams through the wall of the duct on the upper part of the cone whereby the air is circulated up the surface of the cone and through the milk delivery thereon.

4. A milk cooler comprising a conical vessel having means at the base thereof for gathering the cooled milk and discharging the same outside of the vessel, means for circulating a cooling medium through the vessel, a frustro conical casing resting at its lower edge upon the base of and surrounding the conical vessel, said casing having air vents and its upper end extended above the cooling vessel, a milk container resting on the upper edge of the frustro conical casing, the said container having a central vent extending upward adjacent the upper edge of the casing and including a lower end projected through the bottom of the container, the said projected end having apertures for delivering the milk in the container onto the apex end of the conical cooling vessel.

In testimony whereof I affix my signature.

CLINT E. DICKERMAN.